(12) United States Patent
Song

(10) Patent No.: US 12,510,929 B2
(45) Date of Patent: *Dec. 30, 2025

(54) DISPLAY DEVICE

(71) Applicant: Samsung Display Co., LTD., Yongin-si (KR)

(72) Inventor: Ju Hee Song, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 714 days.

This patent is subject to a terminal disclaimer.

(21) Appl. No.: 17/720,604

(22) Filed: Apr. 14, 2022

(65) Prior Publication Data

US 2023/0059225 A1 Feb. 23, 2023

(30) Foreign Application Priority Data

Aug. 3, 2021 (KR) ................ 10-2021-0101756

(51) Int. Cl.
*G06F 1/16* (2006.01)
*B32B 33/00* (2006.01)
*C09J 7/24* (2018.01)

(52) U.S. Cl.
CPC ............ *G06F 1/1652* (2013.01); *B32B 33/00* (2013.01); *C09J 7/243* (2018.01); *G06F 1/1681* (2013.01); *B32B 2250/44* (2013.01); *B32B 2307/542* (2013.01); *B32B 2307/558* (2013.01); *B32B 2307/7376* (2023.05); *B32B 2457/20* (2013.01); *C09J 2301/12* (2020.08); *C09J 2301/312* (2020.08)

(58) Field of Classification Search
CPC ............ C09J 2301/12; C09J 2301/312; G02F 1/1652; B32B 2250/44; B32B 2307/542; B32B 2307/558; B32B 2307/7376; B32B 2457/20; G06F 1/1652
USPC ......................................................... 428/1.5
See application file for complete search history.

(56) References Cited

U.S. PATENT DOCUMENTS

| | | | |
|---|---|---|---|
| 5,665,835 A | 9/1997 | Epple et al. | |
| 11,348,487 B2 | 5/2022 | Lee et al. | |
| 2011/0169022 A1 | 7/2011 | Shiota et al. | |
| 2016/0200949 A1 | 7/2016 | Lee et al. | |
| 2018/0126706 A1 | 5/2018 | Erdogan-Haug et al. | |
| 2018/0312734 A1 | 11/2018 | Heimink et al. | |

(Continued)

FOREIGN PATENT DOCUMENTS

| | | |
|---|---|---|
| JP | 6888730 B1 | 6/2021 |
| KR | 10-2016-0091526 A | 8/2016 |

(Continued)

OTHER PUBLICATIONS

US Office Action dated Apr. 19, 2024, issued in U.S. Appl. No. 17/862,686 (12 pages).

*Primary Examiner* — Ruiyun Zhang
(74) *Attorney, Agent, or Firm* — Womble Bond Dickinson (US) LLP

(57) ABSTRACT

A display device according to an embodiment includes: a display panel; a window on a side of the display panel; a protection member on another side of the display panel; an upper adhesive layer between the display panel and the window; and a lower adhesive layer between the display panel and the protection member, and the lower adhesive layer has a Tan δ value of 1.7 to 2.5 at 30,000 Hz to 100,000 Hz and 25° C.

14 Claims, 7 Drawing Sheets

(56) References Cited

U.S. PATENT DOCUMENTS

2020/0199419 A1    6/2020  Yang et al.
2021/0193962 A1*   6/2021  Song .................... H10K 50/844
2022/0173354 A1    6/2022  Song et al.

FOREIGN PATENT DOCUMENTS

KR    10-2020-0119340 A    10/2020
KR    10-2021-0008262 A     1/2021
KR        10-2216400 B1     2/2021

* cited by examiner

DISPLAY DEVICE

CROSS-REFERENCE TO RELATED APPLICATION

This application claims priority to and the benefit of Korean Patent Application No. 10-2021-0101756, filed on Aug. 3, 2021 in the Korean Intellectual Property Office, the entire content of which is incorporated herein by reference.

BACKGROUND

1. Field

Aspects of embodiments of the present disclosure relate to a display device.

2. Description of the Related Art

A display device is a device that displays video signals. Such a display device may include all devices that display video signals input from the outside, including televisions, computer monitors, PDAs, and smart devices that have recently greatly increased in demand.

A high image quality flat panel display module, such as a light emitting display panel, a liquid crystal display panel, a plasma display panel, and an electrophoretic display panel, may be used in the display device.

Recently, flexible display devices that can be bent or folded, can be reduced in weight and thickness, and can be increased in portability, are being developed. A flexible display device can be implemented by using a flexible substrate, such as plastic, instead of a glass substrate.

However, in the case of a flexible display device, the life span of the display device may be shortened as stress greater than a breaking strength due to excessive bending or repetitive stress from repetitive bending is applied to the display device, and, accordingly, a problem that the element and wire are damaged may occur.

In addition, the flexible display device may have a thin thickness for bending, and, in this case, the impact resistance is reduced, thereby causing a problem that the device is easily damaged.

The above information disclosed in this Background section is provided for enhancement of understanding of the background of the invention, and, therefore, it may contain information that does not form the prior art that is already known in this country to a person of ordinary skill in the art.

SUMMARY

According to an aspect of embodiments of the present invention, a display device having both impact resistance and flexibility is provided. According to another aspect of embodiments of the present invention, a foldable display device having both impact resistance and flexibility is provided.

According to one or more embodiments, a display device includes: a display panel; a window positioned on one side of the display panel; a support member positioned on the other side of the display panel; an upper adhesive layer positioned between the display panel and the window; and a lower adhesive layer positioned between the display panel and the support member, wherein the lower adhesive layer has a Tan $\delta$ value of 1.7 to 2.5 at 30,000 Hz to 100,000 Hz and 25° C.

The lower adhesive layer may have a shear modulus value of 1 MPa to 5 MPa at 30,000 Hz to 100,000 Hz and 25° C.

A storage modulus of the lower adhesive layer may be less than 0.3 MPa at 1 Hz and −25° C.

A storage modulus of the lower adhesive layer may be less than 0.05 MPa at 1 Hz and 25° C.

The Tan $\delta$ value of the lower adhesive layer at 30,000 Hz to 100,000 Hz and 25° C. may be greater than that of the upper adhesive layer at 30,000 Hz to 100,000 Hz and 25° C.

The shear modulus value of the lower adhesive layer at 30,000 Hz to 100,000 Hz and 25° C. may be less than that of the upper adhesive layer at 30,000 Hz to 100,000 Hz and 25° C.

The display device may further include: a protection member between the window and the display panel; and a window protection member on the window, wherein the upper adhesive layer may include: a first adhesive layer between the window and the window protection member; a second adhesive layer between the window and the protection member; and a third adhesive layer between the protection member and the display panel.

The support member may include a first support member, a second support member, and a third support member, and the lower adhesive layer may include: a fourth adhesive layer between the display panel and the first support member; a fifth adhesive layer between the first support member and the second support member; and a sixth adhesive layer between the second support member and the third support member.

A thickness of each of the fourth adhesive layer to the sixth adhesive layer may be less than 20 μm.

The lower adhesive layer may include an acryl resin cured by light having a wavelength of 200 nm to 400 nm.

The lower adhesive layer may include an acryl resin cured by heat of 120° C. to 140° C.

The first support member and the second support member may include a polymer resin; and the third support member may contain at least one of glass, plastic, and a metal.

The third support member may include a folding portion, and the folding portion may include any of a pattern portion with an opening, protrusions and depressions, and links connected to be rotatable with each other.

The display device may be a foldable display device.

According to one or more embodiments, a display device includes: a display panel; a window on a side of the display panel; a support member on another side of the display panel; an upper adhesive layer between the display panel and the window; and a lower adhesive layer between the display panel and the support member, wherein the lower adhesive layer has a shear modulus value of 1 MPa to 5 MPa at 30,000 Hz to 100,000 Hz and 25° C.

The shear modulus value of the lower adhesive layer at 30,000 Hz to 100,000 Hz and 25° C. may be less than that of the upper adhesive layer at 30,000 Hz to 100,000 Hz and 25° C.

A Tan $\delta$ value of the lower adhesive layer at 30,000 Hz to 100,000 Hz and 25° C. may be greater than that of the upper adhesive layer at 30,000 Hz to 100,000 Hz and 25° C.

A storage modulus of the lower adhesive layer at 1 Hz and −25° C. may be less than 0.3 MPa.

A storage modulus of the lower adhesive layer at 1 Hz and 25° C. may be less than 0.05 MPa.

The lower adhesive layer may include a fourth adhesive layer, a fifth adhesive layer, and a sixth adhesive layer, which are separated from each other, and a thickness of each of the fourth adhesive layer, the fifth adhesive layer, and the sixth adhesive layer may be less than 20 μm.

According to an aspect of the embodiments, a display device having both impact resistance and flexibility is provided.

DESCRIPTION OF REFERENCE SYMBOLS

Figure 1:
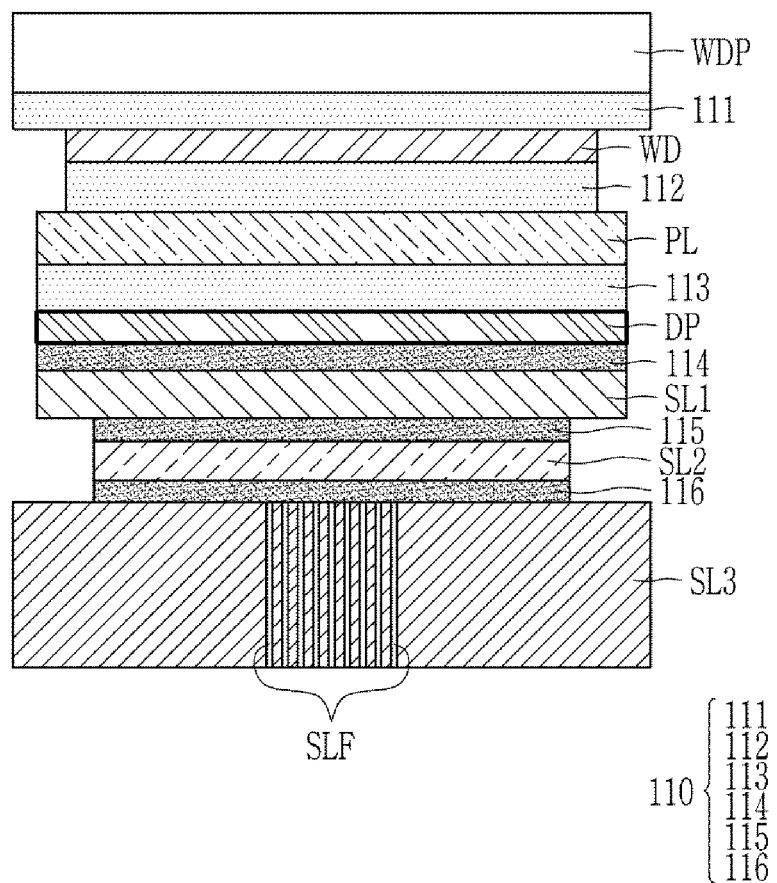
FIG. 1 schematically illustrates a cross-section of a display device according to an embodiment.

| 110: adhesive layer | DP: display panel |
| WD: window | PL: protection member |
| PAL: polarization layer | DT: digitizer |

DETAILED DESCRIPTION

Aspects of the present invention will be described more fully herein with reference to the accompanying drawings, in which some embodiments of the present invention are shown. As those skilled in the art would realize, the described embodiments may be modified in various different ways.

The drawings and description are to be regarded as illustrative in nature and not restrictive. Like reference numerals designate like elements throughout the specification.

In addition, since the size and thickness of configurations shown in the drawings may be arbitrarily indicated for better understanding and ease of description, the present invention is not necessarily limited thereto. In the drawings, the thickness of layers, films, panels, regions, etc., may be exaggerated for clarity. In addition, in the drawings, the thickness of some layers and regions may be exaggerated for better understanding and ease of description.

It is to be understood that when an element, such as a layer, film, region, or substrate, is referred to as being "on" another element, it may be directly on the other element or one or more intervening elements may also be present. In contrast, when an element is referred to as being "directly on" another element, there are no intervening elements present.

In addition, unless explicitly described to the contrary, the word "comprise," and variations such as "comprises" or "comprising" will be understood to imply the inclusion of stated elements but not the exclusion of other elements.

Further, throughout the specification, the phrase "on a plane" means viewing a target portion from the top, and the phrase "on a cross-section" means viewing a cross-section formed by vertically cutting a target portion from the side.

Unless otherwise defined, all terms (including technical and scientific terms) used herein have the same meaning as terms commonly understood by those skilled in the art to which this invention belongs. Also, terms such as terms defined in commonly used dictionaries should be interpreted as having meaning consistent with meaning in the context of the related art, and unless the term is interpreted in an ideal or overly formal sense, they are explicitly defined here.

Herein, a display device according to one or more embodiments will be described with reference to the accompanying drawings. FIG. 1 schematically illustrates a cross-section of a display device according to an embodiment. One or more embodiments of the present invention are characterized in that some physical properties of an adhesive layer positioned under a display panel of a display device are limited, and will be described in further detail below.

Referring to FIG. 1, a display device according to an embodiment may include a window protection member WDP, a window WD, a protection member PL, a display panel DP, a first support member SL1, a second support member SL2, a third support member SL3, and an adhesive layer 110 disposed between the first, second, and third support members SL1, SL2, and SL3.

In an embodiment, the adhesive layer 110 may include a first adhesive layer 111 to a sixth adhesive layer 116. In an embodiment, the adhesive layer 110 may be a pressure sensitive adhesive (PSA). In an embodiment, the adhesive layer 110 may be divided into an upper adhesive layer positioned above the display panel DP and a lower adhesive layer positioned below the display panel DP.

The upper adhesive layer may include a first adhesive layer 111 to a third adhesive layer 113, and the lower adhesive layer may include a fourth adhesive layer 114 to a sixth adhesive layer 116.

The protection member PL may be disposed above the display panel DP. The protection member PL may be adhered to a top surface of the display panel DP through the third adhesive layer 113.

The protection member PL is disposed above the display panel DP to protect the display panel DP from an external impact.

In an embodiment, the protection member PL may be provided as a polymer resin. For example, the protection member PL may include any of polyethersulfone, polyacrylate, polyether imide, polyethylene naphthalate, polyethylene terephthalate, polyphenylene sulfide, polyarylate, polyimide, polycarbonate, cellulose acetate propionate, and the like. However, the present invention is not limited thereto. In an embodiment, the protection member PL may be made of a material such as glass or quartz.

The window WD may be positioned above the protection member PL. The window WD may be adhered to a top surface of the protection member PL through the second adhesive layer 112.

In an embodiment, the window WD may be made of glass. However, the present invention is not limited thereto. In an embodiment, the window WD may include a polymer resin.

The window protection member WDP may be disposed above the window WD. The window protection member WDP may protect the window WD from an external impact and may prevent, substantially prevent, or minimize an occurrence of scratches on an upper surface of the window WD. In an embodiment, the window protection member WDP may include a polymer resin. However, the present invention is not limited thereto, and, in an embodiment, the window protection member WDP may contain an inorganic material.

The first support member SL1 may be positioned under the display panel DP. The first support member SL1 may be adhered to a lower surface of the display panel DP through the fourth adhesive layer 114. The first support member SL1 is disposed under the display panel DP to support the display panel DP and protect the display panel DP from an external impact. In an embodiment, the first support member SL1 may be formed of a polymer resin, such as polyethylene terephthalate or polyimide.

The second support member SL2 may be positioned below the first support member SL1. The second support member SL2 may be adhered to the first support member SL1 through the fifth adhesive layer 115. The second support member SL2 may be positioned under the display panel DP to support the display panel DP. In an embodiment, the second support member SL2 may be formed of a polymer resin, such as polyethylene terephthalate or polyimide.

The third support member SL3 may be positioned under the second support member SL2. The third support member SL3 may be adhered to the second support member SL2 through the sixth adhesive layer 116.

The third support member SL3 may support the display panel DP by being positioned under the display panel DP.

In an embodiment, the third support member SL3 may include a folding structure SLF. The folding structure SLF may have a variable shape or a variable length when the display device is folded. For example, the folding structure SLF may include any of a pattern portion where an opening is formed, a shape of protrusions and depressions, or links rotatably connected to each other. However, the present invention is not limited thereto.

In an embodiment, the third support member SL3 may include at least one of glass, plastic, and metal. In an embodiment, the third support member SL3 may be formed of polyurethane or carbon fiber reinforced plastic (CFRP). In an embodiment, the folding structure SLF may include a same material as the third support member SL3, or may include a different material from the third support member SL3.

In an embodiment, physical properties of the first adhesive layer 111, the second adhesive layer 112, and the third adhesive layer 113 positioned on the display panel DP, and the fourth adhesive layer 114, the fifth adhesive layer 115, and the sixth adhesive layer 116 positioned under the display panel DP may be different.

In an embodiment, the fourth adhesive layer 114, the fifth adhesive layer 115, and the sixth adhesive layer 116 positioned under the display panel DP have a small Tan δ value and a low shear modulus value G' at 30,000 Hz to 100,000 Hz and at a temperature of 25° C. compared to the first adhesive layer 111, the second adhesive layer 112, and the third adhesive layer 113 positioned above the display panel DP.

Tan δ is a numerical value indicating the degree of viscosity/elasticity of a polymer with viscoelasticity, and is defined as a loss modulus/storage modulus. A small value of Tan δ means a large storage modulus and a strong elasticity property. In addition, a large value of Tan δ means a large loss modulus and a strong viscosity property.

Thus, in an embodiment, the fourth adhesive layer 114, the fifth adhesive layer 115, and the sixth adhesive layer 116 positioned below the display panel DP have higher Tan δ values at 30,000 Hz to 100,000 Hz, compared to the first adhesive layer 111, the second adhesive layer 112, and the third adhesive layer 113 positioned on the upper part of the display panel DP.

This will be explained further later, but the Tan δ value is a numerical value to simultaneously or concurrently secure the impact resistance and flexibility of the display device. In an embodiment, the Tan δ value at 30,000 Hz to 100,000 Hz at a temperature of 25° C. of the fourth adhesive layer 114, the fifth adhesive layer 115, and the sixth adhesive layer 116 positioned under the display panel DP may be 1.7 or more. In an embodiment, the Tan δ value at 30,000 Hz to 100,000 Hz at room temperature (25° C.) of the fourth adhesive layer 114, the fifth adhesive layer 115, and the sixth adhesive layer 116 positioned under the display panel DP may be 1.7 to 2.5.

In addition, in an embodiment, the values of the shear modulus G' at 30,000 Hz to 100,000 Hz in the fourth adhesive layer 114, the fifth adhesive layer 115, and the sixth adhesive layer 116 positioned under the display panel DP at room temperature (25° C.) may be 5 MPa or less. In an embodiment, the shear modulus G' at 30,000 Hz to 100,000 Hz of the fourth adhesive layer 114, the fifth adhesive layer 115, and the sixth adhesive layer 116 positioned under the display panel DP at room temperature (25° C.) may be 1 MPa to 5 MPa.

In an embodiment, the value of 30,000 Hz to 100,000 Hz is the behavior when an external impact is applied to the adhesive layer.

That is, when an external impact is applied, each adhesive layer exhibits high-speed driving properties in the tens of thousands of Hz region.

Figure 2:
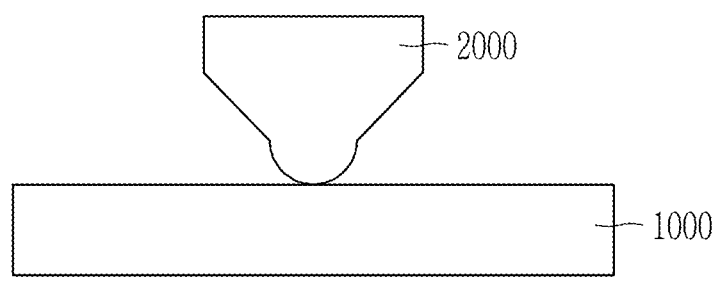
FIG. 2 schematically illustrates a pen drop test.
Figure 3:
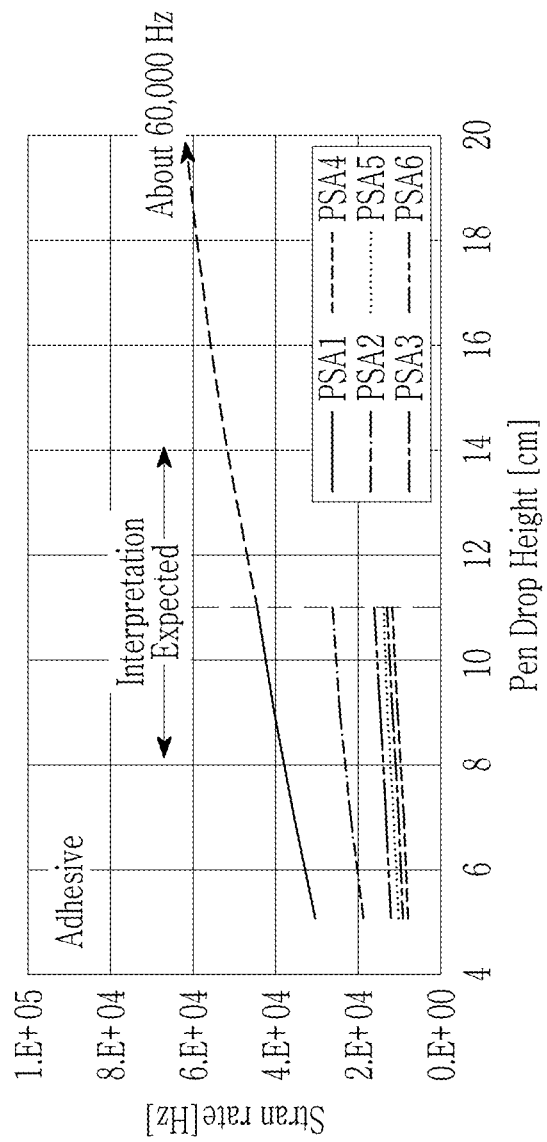
FIG. 3 illustrates measuring Hz of each layer while varying a pen drop height.

The Hz of each adhesive layer is measured at the moment the impact is applied through a pen drop test, and this is shown in Table 1 and FIG. 3. The pen drop test was performed in a method as shown in FIG. 2. That is, a pen 2000 was dropped on an upper surface of a display device 1000 at different heights, and the Hz of each layer was measured.

Table 1 shows the results of measuring the Hz of each adhesive layer when a 0.3 pi pen is dropped from 11 cm.

TABLE 1

| Layering | Strain Rate [Hz] |
| --- | --- |
| PSA1 (first adhesive layer, 111) | 44810 |
| PSA2 (second adhesive layer, 112) | 25430 |
| PSA3 (third adhesive layer, 113) | 20270 |
| PSA4 (fourth adhesive layer, 114) | 12450 |
| PSA5 (fifth adhesive layer, 115) | 16160 |
| PSA6 (sixth adhesive layer, 116) | 18800 |

FIG. 3 shows the Hz of each layer measured while varying the pen drop height. As shown in FIG. 3, it was confirmed that high-speed behavior in the tens of thousands of Hz region occurred inside each adhesive layer when the pen was dropped. That is, tens of thousands of Hz are formed inside each adhesive layer when an external impact is applied to the display device. In this case, when the physical properties of the adhesive layer in such a high-speed behavior state are set to a specific range, flexibility can be secured while ensuring impact resistance, and occurrence of bright spots and cracks can be prevented or substantially prevented.

The impact resistance and flexibility of the display device are complementary to each other.

That is, the thickness of the adhesive layer should be thin in order to secure flexibility, but, in this case, impact resistance may decrease. However, in the case of the display device according to embodiments of the present invention, for a high-speed behavior of the adhesive layer under the display panel DP, the Tan δ value was large and the shear modulus G' value was small, and, thus, the impact resistance was improved.

Herein, a result of measuring a height of occurrence of bright spots and height of cracking while varying thicknesses and physical properties of the fourth adhesive layer 114, the fifth adhesive layer 115, and the sixth adhesive layer 116 will be described.

In the present experimental example, the impact resistance was tested while varying the thickness (15 μm, 25 μm) and composition (PSA A, PSA B) of the fourth adhesive layer 114, the fifth adhesive layer 115, and the sixth adhesive layer 116.

In this case, PSA B has a larger Tan δ value than PSA A and a smaller shear modulus G' value at high speed.

Figure 4:
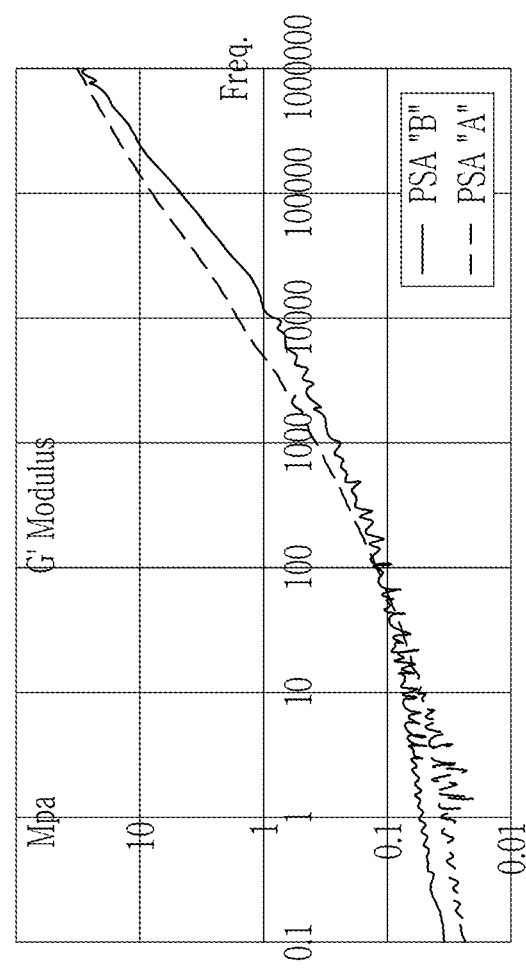
FIG. 4 illustrates a shear modulus (G') according to the number of vibrations of PSA A and PSA B according to an experimental example.
Figure 5:
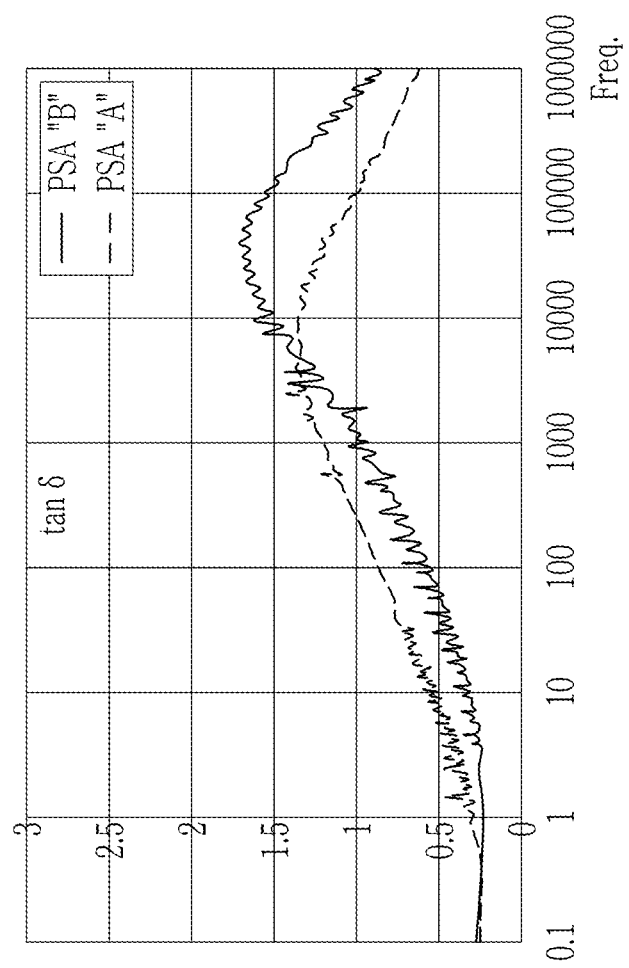
FIG. 5 illustrates Tan δ according to the number of vibrations of PSA A and PSA B according to the experimental example.

FIG. 4 and FIG. 5 illustrate the shear modulus G' and the Tan δ according to the number of vibrations of PSA A and PSA B according to the present experimental example.

Referring FIG. 4, it was determined that the shear modulus G' of PSA B was lower than that of PSA A at the number of vibrations above 100 Hz.

In addition, referring to FIG. 5, it was determined that the Tan δ value of PSA B was larger than the Tan δ value of PSA A at the number of vibrations above 10,000 Hz.

Table 2 shows a measurement result of the shear modulus value of each PSA at 1 Hz while varying the temperature.

TABLE 2

| Name | Shear modulus (G', KPa) by Rheometer | | | |
|---|---|---|---|---|
| | −20° C. | 25° C. | 60° C. | 85° C. |
| PSA A | 201.8 | 32.5 | 24.1 | 21.2 |
| PSA B | 150.2 | 48.1 | 34.1 | 28.4 |

Table 3 shows the shear modulus value of each PSA in a high vibration frequency section.

TABLE 3

| PSA (G' MPa) | 1 Hz | 10 Hz | 100 Hz | 1000 Hz | 10,000 Hz | 30,000 Hz | 100,000 Hz |
|---|---|---|---|---|---|---|---|
| A | 0.03 | 0.05 | 0.12 | 0.37 | 1.53 | 3.35 | 7.90 |
| B | 0.05 | 0.07 | 0.11 | 0.26 | 0.75 | 1.65 | 4.49 |

Table 4 shows the Tan δ value of each PSA in the high vibration frequency section.

TABLE 4

| PSA (Tan δ) | 1 Hz | 10 Hz | 100 Hz | 1000 Hz | 10,000 Hz | 30,000 Hz | 100,000 Hz |
|---|---|---|---|---|---|---|---|
| A | 0.35 | 0.60 | 1.04 | 1.42 | 1.58 | 1.43 | 1.17 |
| B | 0.29 | 0.35 | 0.68 | 1.11 | 1.81 | 1.99 | 1.84 |

PSA A and PSA B having compositions of Table 2 to Table 4 and FIG. 4 and FIG. 5 were applied as the fourth adhesive layer 114, the fifth adhesive layer 115, and the sixth adhesive layer 116, respectively, and the results of measuring heights of the bright spots and a height of cracking while varying the thickness are shown in Table 5.

TABLE 5

| Impact resistance evaluation results | | | | | |
|---|---|---|---|---|---|
| | | Experimental Example 1 | Experimental Example 2 | Experimental Example 3 | Experimental Example 4 |
| Layering structure | Upper structure | Window protection member WDP/first adhesive layer 111/window WD/second adhesive layer 112/protection member PL/third adhesive layer 113 Display panel DP | | | |
| | Fourth adhesive layer 114 | PSA A 25 μm | PSA A 15 μm | PSA B 15 μm G'↑, tan δ↑ | PSA B 25 μm G'↑, tan δ↑ |
| | | First support member SL1 | | | |
| | Fifth adhesive layer 115 | PSA A 25 μm | PSA A 15 μm | PSA B 15 μm G'↓, tan δ↑ | PSA B 25 μm G'↑, tan δ↑ |
| | | Second support member SL2 | | | |
| | Sixth adhesive layer 116 | PSA A 25 μm | PSA A 15 μm | PSA B 15 μm G'↓, tan δ↑ | PSA B 25 μm G'↑, tan δ↑ |
| | | Third support member SL3 | | | |
| Impact resistance (Pen drop/0.3φ) | Bright Spot cm (Min/Avg.) | 9/9.4 | 10/10.8 | 12/12.2 | 10/10.8 |
| | Cracking cm (Min/Avg.) | 10/10.8 | 10/10.4 | 11/11.2 | 10/10.8 |

In Table 5, comparing Experimental Example 1 and Experimental Example 2, it was determined that the thinner the thickness of the adhesive layer, the better the impact resistance. Similarly, comparing Experimental Example 3 and Experimental Example 4, it was determined that the thinner the thickness of the adhesive layer, the better the impact resistance.

Comparing Experimental Example 1 and Experimental Example 4, even though a thickness of each adhesive layer is the same, that is 25 μm, it can be confirmed that Experimental Example 4 using PSA B with a smaller shear modulus and a larger Tan δ value has better impact resistance.

Similarly, comparing Experimental Example 2 and Experimental Example 3, even though a thickness of each adhesive layer is the same, that is 15, Experimental Example 4 using PSA B with a smaller shear modulus and a larger Tan δ value showed better impact resistance.

That is, by summarizing the results in Table 5, it can be determined that the thickness should be thin to improve the impact resistance, the shear modulus value should be small during high-speed operation (G'↓), and the tan δ value should be large (tan δ↑).

As described, in the display device according to an embodiment, the impact resistance was improved by setting the Tan δ value at 30,000 Hz to 100,000 Hz of the fourth adhesive layer 114, the fifth adhesive layer 115, and the sixth adhesive layer 116 positioned under the display panel DP at room temperature (25° C.) to 1.7 or more. In addition, under the same conditions, the shear modulus G' value was set to 5 MPa or less to improve impact resistance. In an embodiment, the fourth adhesive layer 114, the fifth adhesive layer 115, and the sixth adhesive layer 116 may satisfy both or only one of the shear modulus value and the Tan δ value.

In addition, since the display device according to an embodiment may be foldable, the adhesive layer 110 including the fourth adhesive layer 114, the fifth adhesive layer 115, and the sixth adhesive layer 116 may have a storage modulus at −25° C. of 0.3 MPa or less.

In addition, the pressure-sensitive adhesive layer 110 may have a storage modulus of 0.05 MPa or less at 25° C. This is a numerical range for the foldable display device to bend the display device well.

In addition, in the display device according to the present embodiment, the thickness of the fourth adhesive layer 114, the fifth adhesive layer 115, and the sixth adhesive layer 116 may be 20 μm or less. This is because, as shown in Table 5, the thinner the thickness of the adhesive layer, the better the impact resistance. When the thickness of the adhesive layer is too thin, the impact resistance may be rather reduced, and, in an embodiment, the thickness of the fourth adhesive layer 114, the fifth adhesive layer 115, and the sixth adhesive layer 116 may be 10 μm to 20 μm.

In addition, the adhesive layer 110 according to an embodiment may be an acryl resin cured by UV. In an embodiment, the acryl resin contains a photo-initiator and can be cured by a specific wavelength, for example, a wavelength of 200 nm to 400 nm.

In an embodiment, the adhesive layer 110 may be an acryl resin cured by heat. In an embodiment, curing of the resin may occur by irradiating heat from 100° C. to 140° C.

Next, an example of a display device including an adhesive layer according to an embodiment will be described with reference to the drawings. However, this is provided as an example, and the present invention is not limited thereto.

Figure 6:
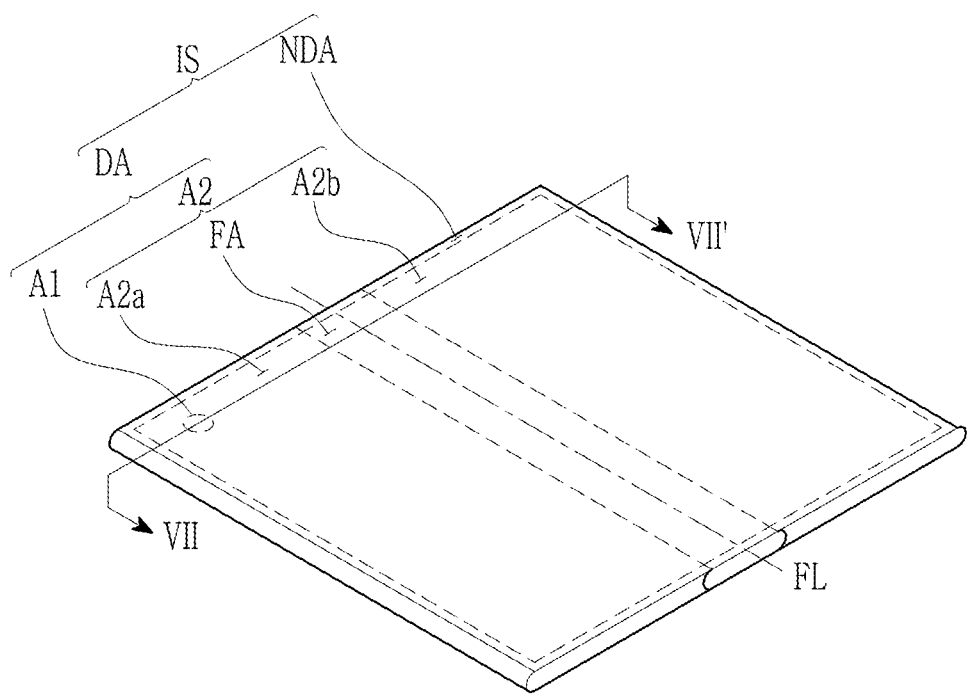
FIG. 6 is a schematic perspective view of a display device according to an embodiment.
Figure 7:
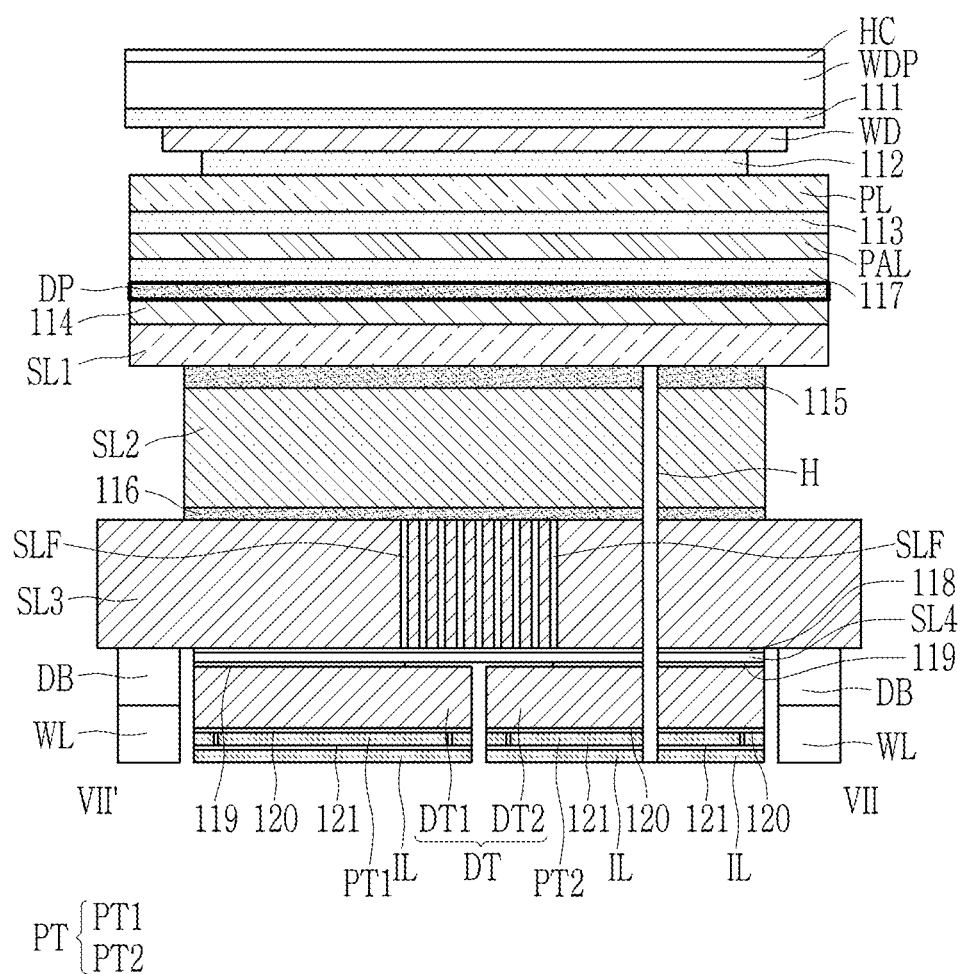
FIG. 7 is a schematic cross-sectional view of the display device of FIG. 6.

FIG. 6 is a schematic perspective view of a display device according to an embodiment; and FIG. 7 is a schematic cross-sectional view of the display device of FIG. 6. In FIG. 6, a display device is illustrated as a foldable display device, and FIG. 7 is provided for description of a layering relationship between members that form the display device, and, in FIG. 7, the members forming the display device are simply illustrated.

Referring to FIG. 6, in an embodiment, a display device may be a foldable display device. The display device may be folded around a folding axis FL. In an embodiment, a display surface IS of the display device may be positioned outside or inside the display device.

In an embodiment, the display panel may include a display area DA and a non-display area NDA. The display area DA is an area in which an image is displayed, and may be an area in which an external input is simultaneously or concurrently sensed. The display area DA may be an area in which a plurality of pixels, which will be described later, is disposed.

The display area DA may include a first area A1 and a second area A2. In addition, the second area A2 may include a first second area A2a, a second second area A2b, and a folding area FA. The first second area A2a and the second second area A2b may be positioned on the left and right sides of the folding axis FL, respectively, and the folding area FA may be positioned between the first second area A2a and the second second area A2b. However, the present invention is not limited thereto.

The first area A1 may have relatively high light transmittance compared to the second area A2. In addition, the first area A1 may have a relatively smaller area than the second area A2. In an embodiment, the first area A1 may be defined as an area overlapping an area where a module (e.g., an electron module) is disposed inside a housing of a display panel. In an embodiment, the first area A1 is shown having the shape of a circle, but the present invention is not limited thereto, and the first area A1 may have any of various shapes, such as polygons, ellipses, and figures with at least one curved line.

The display device may receive an external signal through the first area A1 or may provide an output signal therethrough to the outside.

Referring to FIG. 7, in an embodiment, the display device may include a window protection member WDP, a window WD, a protection member PL, a polarization layer PAL, a display panel DP, a first support member SL1, a second support member SL2, a third support member SL3, a fourth support member SL4, a digitizer DT, a plate PT, an insulation film IL, a step member DB, a waterproof member WL, and an adhesive layer 110 positioned between these structures.

In an embodiment, the window protection member WDP, the window WD, the protection member PL, the display panel DP, the first support member SL1, the second support member SL2, the third support member SL3, and the first adhesive layer 111 to the sixth adhesive layer 116 are the same as those described with reference to FIG. 1, and, therefore, a further detailed description of the same constituent elements will be omitted.

Referring to FIG. 7, in an embodiment, a hard coating layer HC may be positioned on the window protection member WDP. The hard coating layer HC may be formed of an organic material such as a polymer resin. However, the present invention is not limited thereto. In an embodiment, the hard coating layer HC may be formed of an inorganic material.

The hard coating layer HC may be an outermost layer of the display device. This is a layer directly touched by a user, and when the outermost layer of the display device is the window or the window protection member WDP, a user's touch feeling may deteriorate. In an embodiment, since the outermost layer of the display device is provided as a hard coating layer HC, a smooth and soft touch feeling can be provided to a user.

Referring to FIG. 7, the polarization layer PAL may be positioned between the protection member PL and the display panel DP. The polarization layer PAL may be adhered to the display panel DP through the seventh adhesive layer 117. The protection member PL may be adhered to the polarization layer PAL through the third adhesive layer 113.

In one or more embodiments, the polarization layer PAL and the seventh adhesive layer 117 may be omitted.

Next, referring to FIG. 7, a fourth support member SL4 is positioned under the third support member SL3. The fourth support member SL4 may be adhered to the fourth support member SL4 through an eighth adhesive layer 118.

The digitizer DT is positioned at the bottom of the fourth support member SL4. The digitizer DT may be adhered to the fourth support member SL4 through a ninth adhesive layer 119.

The digitizer DT may include a body layer and/or a pattern layer. The digitizer DT may detect a signal input from an external electronic pen or the like through the pattern layer. In an embodiment, the digitizer DT may detect intensity and a direction of a signal input from an electronic pen, and the like.

If the digitizer DT is provided integrally, cracks may occur in the body layer and/or pattern layer of the digitizer DT when the display device is folded. In an embodiment, the digitizer DT may include a first digitizer DT1 positioned to the left of the folding axis FL and a second digitizer DT2 positioned to the right of the folding axis FL.

The first digitizer DT1 may at least partially overlap the first second area A2a, and the second digitizer DT2 may at least partially overlap the second second area A2b of FIG. 6.

In addition, the first digitizer DT1 may at least partially overlap the folding area FA (refer to FIG. 6), and the second digitizer DT2 may at least partially overlap the folding area FA (refer to FIG. 6).

In an embodiment, the first digitizer DT1 and the second digitizer DT2 may be spaced apart from each other with the folding axis FL interposed therebetween. That is, the digitizer DT may be provided as a separate type instead of an integral type. In an embodiment, since the digitizer DT is provided in a separable structure, it is possible to prevent, substantially prevent, or minimize cracks from occurring in the body layer and/or pattern layer disposed in the folding area FA.

In an embodiment, the digitizer DT is provided as a separate type, while the digitizer DT provided as a separate type is provided to overlap at least partially with the folding area FA (refer to FIG. 6), and, thus, signals can be received even in the folding area FA, thereby improving a user's convenience.

A plate PT may be positioned under the digitizer DT. The plate PT may be adhered to a lower surface of the digitizer DT through a tenth adhesive layer 120. In an embodiment, the tenth adhesive layer 120 may not be provided in a portion corresponding to the folding area FA (refer to FIG. 6).

The plate PT may transfer heat generated by the digitizer DT to the outside. In an embodiment, the plate PT may include a metal with good heat transfer efficiency. In an embodiment, the plate PT may be provided with graphite having high thermal conductivity in the planar direction. When the plate PT is provided with graphite, the plate PT can be provided with a thinner thickness than when the plate PT is provided with metal. In addition, the plate PT may be disposed to a lower portion of the digitizer DT to support the digitizer DT, and to protect the digitizer DT from an external impact.

The plate PT may include a first plate PT1 positioned to the left of the folding axis FL and a second plate PT2 positioned to the right of the folding axis FL.

The insulating film IL may be positioned under the plate PT. The insulating film IL may be adhered to the plate PT through an eleventh adhesive layer 121.

The step member DB and the waterproof member WL may be positioned on the outside of the fourth support member SL4, the digitizer DT, the plate PT, and the insulation film IL.

The waterproof member WL blocks or absorbs moisture inflowing from the outside of the display device to prevent, substantially prevent, or minimize damage to the components of the display device by moisture. In an embodiment, the waterproof member WL may include a tape, a sponge, and the like.

The step member DB may compensate for a step while positioning between the waterproof member WL and the third support member SL3.

In an embodiment, penetration holes H corresponding to the first area A1 may be formed in the fifth adhesive layer 115, the second support member SL2, the sixth adhesive layer 116, the third support member SL3, the eighth adhesive layer 118, the fourth support member SL4, the ninth adhesive layer 119, the digitizer DT, the tenth adhesive layer 120, the plate PT, the eleventh adhesive layer 121, and the insulating film IL, respectively. However, the present invention is not limited thereto.

As described above, in a display device according to one or more embodiments, the Tan δ value at 30,000 Hz to 100,000 Hz of the fourth adhesive layer 114, the fifth adhesive layer 115, and the sixth adhesive layer 116 positioned under the display panel DP, at room temperature (25° C.) is set to 1.7 or more, thereby improving impact resistance. In addition, under the same condition, the shear modulus G' value is set to 5 MPa or less to improve impact resistance.

In addition, the adhesive layer 110 including the fourth adhesive layer 114, the fifth adhesive layer 115, and the sixth adhesive layer 116 may have a storage modulus of 0.3 MPa or less at −25° C. In addition, the adhesive layer 110 may have a storage modulus of 0.05 MPa or less at 25° C.

An adhesive layer that satisfies these storage modulus values can provide for a display device to bend well in a foldable display device.

While the present invention has been described in connection with what are presently considered to be some practical embodiments, it is to be understood that the invention is not limited to the disclosed embodiments. On the contrary, it is intended to cover various modifications and equivalent arrangements included within the spirit and scope of the appended claims.

What is claimed is:

1. A display device comprising:
a display panel;
a window on a side of the display panel;
a support member on another side of the display panel;
an upper adhesive layer between the display panel and the window; and
a lower adhesive layer between the display panel and the support member,
wherein the lower adhesive layer is a pressure sensitive adhesive and comprises an acryl resin cured by light having a wavelength of 200 nm to 400 nm or an acryl resin cured by heat of 120° C. to 140° C.,
wherein, as measured at a moment an impact is applied through a pen drop test, the lower adhesive layer has a Tan δ value of 1.7 to 2.5 at 30,000 Hz to 100,000 Hz and 25° C., and the Tan δ value of the lower adhesive layer at 30,000 Hz to 100,000 Hz and 25° C. is greater than that of the upper adhesive layer at 30,000 Hz to 100,000 Hz and 25° C.,
wherein the lower adhesive layer has a shear modulus value of 1 MPa to 5 MPa at 30,000 Hz to 100,000 Hz and 25° C.

2. The display device of claim 1, wherein the shear modulus value of the lower adhesive layer at 30,000 Hz to 100,000 Hz and 25° C. is less than that of the upper adhesive layer at 30,000 Hz to 100,000 Hz and 25° C.

3. The display device of claim 1, wherein a storage modulus of the lower adhesive layer is less than 0.3 MPa at 1 Hz and −25° C.

4. The display device of claim 1, wherein a storage modulus of the lower adhesive layer is less than 0.05 MPa at 1 Hz and 25° C.

5. The display device of claim 1, further comprising:
a protection member between the window and the display panel; and
a window protection member on the window,
wherein the upper adhesive layer comprises:
a first adhesive layer between the window and the window protection member;
a second adhesive layer between the window and the protection member; and
a third adhesive layer between the protection member and the display panel.

6. The display device of claim 1, wherein
the support member comprises a first support member, a second support member, and a third support member, and
the lower adhesive layer comprises:
a fourth adhesive layer between the display panel and the first support member;
a fifth adhesive layer between the first support member and the second support member; and
a sixth adhesive layer between the second support member and the third support member.

7. The display device of claim 6, wherein a thickness of each of the fourth adhesive layer to the sixth adhesive layer is less than 20 μm.

8. The display device of claim 6, wherein
the first support member and the second support member comprise a polymer resin, and
the third support member contains at least one of glass, plastic, and a metal.

9. The display device of claim 8, wherein
the third support member comprises a folding portion, and
the folding portion comprises any of a pattern portion with an opening, protrusions and depressions, and links connected to be rotatable with each other.

10. The display device of claim 1, wherein the display device is a foldable display device.

11. A display device comprising:
a display panel;
a window on a side of the display panel;
a support member on another side of the display panel;
an upper adhesive layer between the display panel and the window; and
a lower adhesive layer between the display panel and the support member,
wherein the lower adhesive layer is a pressure sensitive adhesive and comprises an acryl resin cured by light having a wavelength of 200 nm to 400 nm or an acryl resin cured by heat of 120° C. to 140° C.,
wherein, as measured at a moment an impact is applied through a pen drop test, the lower adhesive layer has a shear modulus value of 1 MPa to 5 MPa at 30,000 Hz to 100,000 Hz and 25° C., and the shear modulus value of the lower adhesive layer at 30,000 Hz to 100,000 Hz and 25° C. is less than that of the upper adhesive layer at 30,000 Hz to 100,000 Hz and 25° C.,
wherein a Tan δ value of the lower adhesive layer at 30,000 Hz to 100,000 Hz and 25° C. is greater than that of the upper adhesive layer at 30,000 Hz to 100,000 Hz and 25° C.

12. The display device of claim 11, wherein a storage modulus of the lower adhesive layer at 1 Hz and −25° C. is less than 0.3 MPa.

13. The display device of claim 11, wherein a storage modulus of the lower adhesive layer at 1 Hz and 25° C. is less than 0.05 MPa.

14. The display device of claim 11, wherein
the lower adhesive layer comprises a fourth adhesive layer, a fifth adhesive layer, and a sixth adhesive layer, which are separated from each other, and
a thickness of each of the fourth adhesive layer, the fifth adhesive layer, and the sixth adhesive layer is less than 20 μm.

* * * * *